United States Patent
Deva Sahayam Arul Raj et al.

(10) Patent No.: US 11,340,948 B2
(45) Date of Patent: May 24, 2022

(54) TIMED MULTI-THREAD ACCESS FOR HIGH-THROUGHPUT SLOW-RESPONSE SYSTEMS

(71) Applicant: Microsoft Technology Licensing, LLC, Redmond, WA (US)

(72) Inventors: Jovin Vasanth Kumar Deva Sahayam Arul Raj, Redmond, WA (US); Avinash G. Pillai, Redmond, WA (US); Apsara Karen Selvanayagam, Sammamish, WA (US); Jinghua Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 238 days.

(21) Appl. No.: 16/577,771

(22) Filed: Sep. 20, 2019

(65) Prior Publication Data
US 2020/0379797 A1    Dec. 3, 2020

Related U.S. Application Data

(60) Provisional application No. 62/854,851, filed on May 30, 2019.

(51) Int. Cl.
*G06F 9/50* (2006.01)
*G06F 16/23* (2019.01)
(Continued)

(52) U.S. Cl.
CPC ............ *G06F 9/5038* (2013.01); *G06F 9/466* (2013.01); *G06F 9/5005* (2013.01);
(Continued)

(58) Field of Classification Search
CPC ...... G06F 9/466; G06F 9/5005; G06F 9/4881; G06F 9/5083; G06F 16/2376; G06F 7/582; G06F 2209/5018
See application file for complete search history.

(56) References Cited

U.S. PATENT DOCUMENTS

| | | |
|---|---|---|
| 7,895,352 B2 | 2/2011 | Ageyev et al. |
| 8,712,998 B2 | 4/2014 | Kashyap |

(Continued)

OTHER PUBLICATIONS

Colohan, et al., "Incrementally Parallelizing Database Transactions with Thread-Level Speculation", In Journal of ACM Transactions on Computer Systems, vol. 26, Issue 1, Feb. 2008, 50 Pages.
(Continued)

*Primary Examiner* — Jacob D Dascomb
(74) *Attorney, Agent, or Firm* — Schwegman Lundberg & Woessner, P.A.

(57) ABSTRACT

A method for controlling transactional processing system having transactions that include multiple tasks, a throughput limit a transaction processing time limit includes allocating a plurality of threads to be used by multiple tasks to achieve a throughput approximating the throughput limit. The method assigns the multiple tasks to the plurality of threads and assigns respectively different processing delays to the plurality of threads. The processing delays span an interval less than the transaction processing time limit. The method processes the multiple tasks within the transaction processing time limit by executing the plurality of threads at times determined by the respective processing delays.

20 Claims, 4 Drawing Sheets

(51) Int. Cl.
*G06F 9/46* (2006.01)
*G06F 7/58* (2006.01)

(52) U.S. Cl.
CPC .......... *G06F 16/2379* (2019.01); *G06F 7/582* (2013.01); *G06F 2209/5018* (2013.01)

(56) References Cited

U.S. PATENT DOCUMENTS

| | | | | |
|---|---|---|---|---|
| 9,183,037 | B2* | 11/2015 | Patanella | G06F 9/46 |
| 9,424,077 | B2 | 8/2016 | Geng et al. | |
| 9,928,260 | B2* | 3/2018 | Sitsky | G06F 9/505 |
| 10,019,756 | B2 | 7/2018 | Atkin | |
| 10,860,604 | B1* | 12/2020 | Pandey | G06F 16/23 |
| 2005/0131893 | A1* | 6/2005 | Von Glan | G06F 16/24532 |
| 2012/0016901 | A1 | 1/2012 | Agarwal et al. | |
| 2012/0066683 | A1 | 3/2012 | Srinath | |
| 2013/0326529 | A1* | 12/2013 | Augenstein | G06F 9/50 |
| | | | | 718/103 |
| 2016/0350152 | A1* | 12/2016 | Gadelrab | G06F 9/46 |
| 2018/0267805 | A1 | 9/2018 | Caulfield et al. | |
| 2019/0286989 | A1* | 9/2019 | Wang | G06N 3/0454 |
| 2020/0257539 | A1* | 8/2020 | Borlick | G06N 20/00 |

OTHER PUBLICATIONS

Ding, et al., "Improving Optimistic Concurrency Control through Transaction Batching and Operation Reordering", In Proceedings of the VLDB Endowment, vol. 12, Issue 2, Oct. 1, 2018, 14 Pages.

Thake, et al., "Combine Multiple Requests in one HTTP call using JSON Batching", Retrieved From: https://docs.microsoft.com/en-us/graph/json-batching, Jun. 22, 2019, 6 Pages.

"International Search Report and Written Opinion Issued in PCT Application No. PCT/US20/030576", dated Aug. 19, 2020, 12 Pages.

* cited by examiner

TIMED MULTI-THREAD ACCESS FOR HIGH-THROUGHPUT SLOW-RESPONSE SYSTEMS

This application claims the benefit of priority to U.S. Provisional Application Ser. No. 62/854,851, filed on May 30, 2019, and which is incorporated herein by reference in its entirety.

BACKGROUND

For many distributed systems and network-connected (e.g., cloud-based) services, the performance of an individual request is slow but the throughput of the system is high. For example, on-line transactional processing (OLTP) systems such as non-relational database systems (e.g., Cassandra®, HBase®, and Microsoft® Azure® table storage) may have throughputs on the order of 10,000-20,000 data entities serviced per second and a service-based service level agreement (SLA) that specifies a transaction processing time limit of 30 s. Transaction defines tasks to access data entities (e.g., records) stored in a non-relational database. A non-relational database, such as a wide-column store database, may have a number of dynamic columns, the contents of which are determined by the applications accessing the database. Each data entity corresponds to a row of the wide-column store database. The column names as well as the data entity keys are not fixed by the wide-column store and can be configured as two-dimensional key-value records where the format of the data is also determined by the applications that execute the tasks to access the data. In addition, OLTP systems typically employ a throttling process that regulates the rate at which the OLTP system processes data. For example, a wide-column store having a throttling window of one second (1 s) may limit the number of data entities to be processed to 20,000 per second. This limit is the throughput limit of the wide-column store database.

Systems that access data in a non-relational database may attempt to store large amounts of data into a table of the non-relational database at a rate greater than the non-relational database can complete the storing operations. In this instance, the throttling process may drop storage requests that exceed the throttling threshold. This causes the system using the non-relational database to retry the storing operations at a later time, reducing overall system efficiency.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
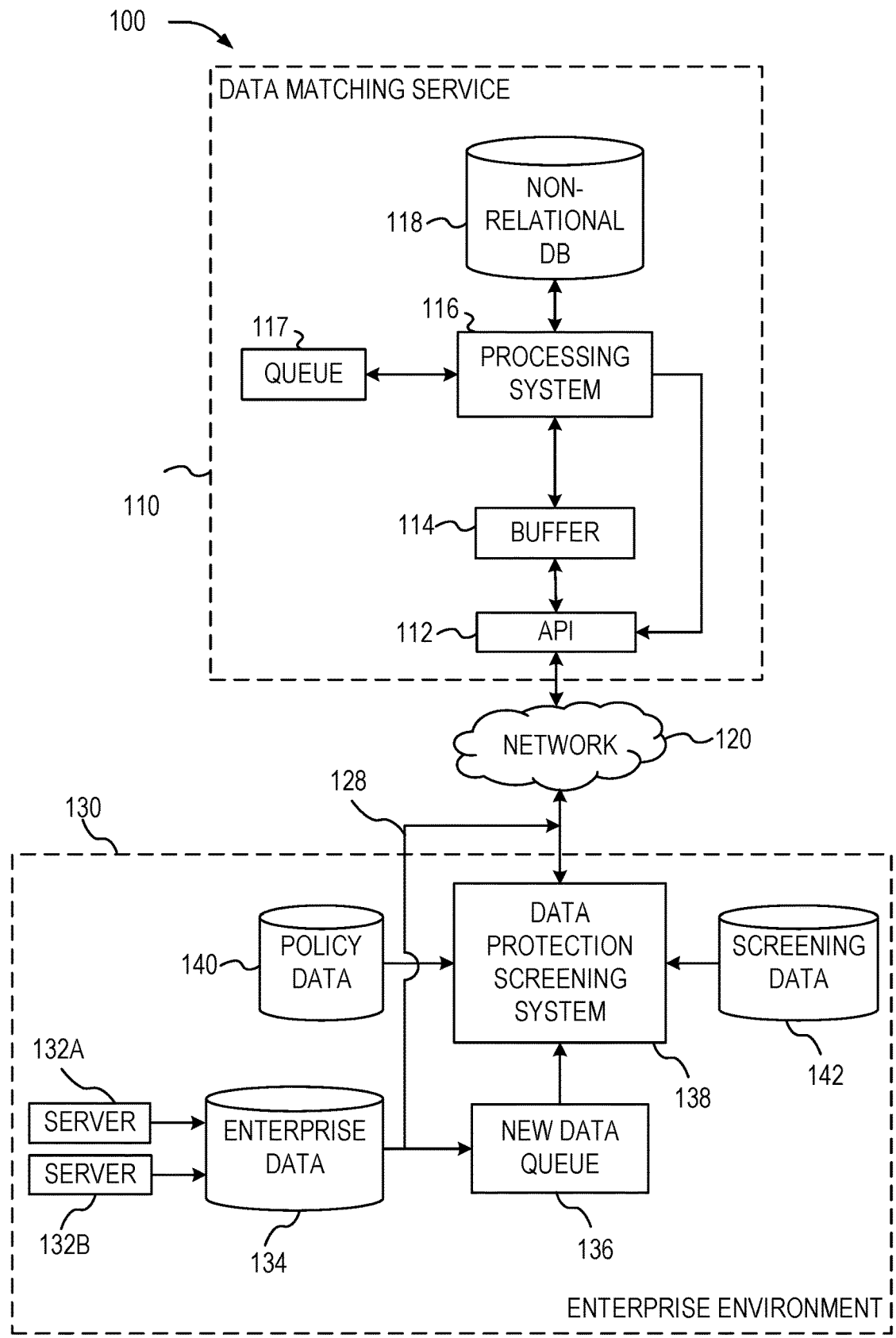
FIG. 1 is a block diagram of a data protection system according to an example embodiment.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The disclosed embodiments provide for efficient use of an on-line transactional processing (OLTP) system having a throttling window that is shorter than a transaction processing time limit for the OLTP system. In these embodiments, the volume of tasks received by the OLTP in a single transaction during the throttling window may exceed the throughput of the OLTP system. An example OLTP system initiates a number of threads that is determined by the throughput of the OLTP system, the transaction time limit and the number of tasks in each transaction request. The OLTP system divides the threads into a number of groups based on the throughput of the OLTP system. The multiple threads may be implemented on multiple virtual machines (VMs) running on a single processing system and/or across multiple processing systems. The processing system may include one or more single core or multi-core processors. The OLTP system assigns respectively different processing delays to the groups of threads. In an example system, the processing delays span the transaction processing time limit and are distributed evenly among the groups of threads. At times corresponding to each of the processing delays, the OLTP system executes the group of threads having the respective processing delay. This technique allows the OLTP system to process the tasks at or near the throughput of the system while not exceeding the transaction processing time limit specified in the service-based SLA.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The examples below are described in terms of a data protection system for use in a network-connected environment that utilizes a non-relational database such as, but not limited to, Cassandra®, HBase®, and Microsoft® Azure® table storage. Non-relational database, also known as NoSQL databases, allow for the storage and retrieval of data using methods other than the table relations used by relational databases. In the examples described below, a task is a request to access a data entity (e.g., a single row of the non-relational database). Due to their relative simplicity and ability to handle large data sets, non-relational databases have utility in big data and real-time web applications. The material described below, however, is not limited to database operations. It has broader application to any transactional system that includes multiple tasks in each transaction and in which the transaction processing time limit is longer than a throttling window defined by a throttling process of the transactional system. Examples of such systems include web applications such as crowd-sourced applications and artificial intelligence (AI) systems.

An example data protection system includes two parts, an on-premises part and a remote, or network-connected part. The on-premises part analyzes network data intended for distribution outside a secure enterprise environment, such as a corporate intranet. The network data is analyzed against one or more heuristics to detect indications of sensitive information. For example, one heuristic may detect numbers arranged in a manner such that could be credit card information. Another heuristic may detect patterns that are similar to patterns included in one or more databases maintained by the enterprise. Because some portion of the enterprise data is maintained in the network-connected part, it may not be practical for an on-premises solution to precisely identify a source of the data. Once an indication of sensitive information in the network data is detected via the on-premises scanning, a portion of the network data including the indication is sent to a data matching service. The data matching service has access to a more comprehensive set of sensitive enterprise data stored in the non-relational database, which may include data primarily located in network-connected part, and thus not on-premises in comprehensive form.

Upon receiving the portion of the data, the data matching service system compares the portion to the more comprehensive set of sensitive enterprise data in the network-connected part, and responds to the on-premises part with an indication of whether sensitive enterprise data matching the received data portion was identified. If the data matching service finds matching data, the data matching service indicates that the portion includes information deemed sensitive by the enterprise. If the data matching service does not find matching data, the data matching service indicates that the portion does not include information deemed sensitive by the enterprise. The on-premises component then selectively allows the network data to be transmitted outside the secure enterprise environment or blocks said transmission if the network data is sensitive.

In these examples, the enterprise data stored in the non-relational database of the data matching service may include thousands or millions of data entities. Further, multiple processes may concurrently access the data matching service, providing records to be compared to the entries in the non-relational database table. Consequently, when the enterprise data is initially provided to the non-relational database as well as during high-usage intervals in which multiple applications concurrently request indications of whether portions of data being processed contain sensitive information. The data matching service may receive transactions including more tasks to access data entities than the service can process while satisfying both the throughput and the transaction processing time limitations.

FIG. 1 is an overview of a networked system, at least a portion of which may be implemented by one or more of the disclosed embodiments. The networked system 100 includes an on-premises enterprise environment 130 including one or more servers 132A and 132B. The servers 132A and 132B provide network data to an enterprise data store 134. The network data may be provided by the servers 132A and 132B from client devices (not shown) which connect to other devices (not shown) outside of the enterprise environment 130 via a firewall (not shown). As described above, the disclosed embodiments provide for monitoring and control of the network data leaving the enterprise 130.

In the example embodiment, the network data is processed and stored in an enterprise database 134. The network data is screened in the enterprise environment 130 to determine whether it may include sensitive data. The network data is provided either directly from the enterprise database 134 or from a new data queue 136, which, in turn, provides the network data to a data protection screening system (DPSS) 138. Alternatively, the network data may be provided directly by the servers 132A and 132B to the DPSS 138. The DPSS 138 compares the network data to data in a policy data store 140 and a screening data store 142 to perform one or more screening methods on the network data.

The new data queue 136 may contain updated data from the enterprise database 134 which is uploaded to the non-relational database 118 of the data matching service 110 either continually or at predetermined intervals.

Each of the one or more screening methods identify whether the network data includes one or more indications of sensitive information. The screening methods may perform a variety of analyses on the network data to determine whether the network data includes sensitive information. In some embodiments, the screening methods may employ one or more of regular expression evaluation and/or keyword matching on the network data. Information defining the regular expressions and/or keywords to be identified in the network data in the new data queue 136 may be obtained by the DPSS 138 from the screening data 142. In some aspects, screening data may be policy specific. The policy may be based on one or more of a time of day, user identifier, group identifier, or other parameters. The policy to apply to the network data in the new data queue 136 may be obtained from the policy data store 140.

The disclosed embodiments may segment the network data received from one or more of the servers 132A and 132B, the enterprise database 134, or the new data queue 136 into portions, and determine whether each portion includes indications of sensitive data. Thus, for example, if the received network data represents a single electronic document, that document may be segmented into multiple portions, and the DPSS 138 may determine whether each of the multiple portions includes an indication of sensitive information. While the screening methods do not determine with certainty whether the network data includes sensitive information, they provide an indication of a risk that sensitive information is included in the network data in the new data queue 136.

If a portion of the network data in the new data queue 136 is determined to present a risk of exposing sensitive information, the DPSS 138 sends the portion to a data matching service 110 via a network 120, such as the Internet. The data matching service 110 compares the received portion to sensitive enterprise data stored in the non-relational database 118. The example non-relational database 118 is populated from the enterprise data store 134 located within the enterprise environment 130 and from other enterprise databases located in other enterprise environments. In some embodiments described with reference to FIGS. 2, 3, and 4, sensitive data from the enterprise data store 134 may be uploaded to the non-relational database 118, as shown by the connector 128, before the network data is received from the servers 132A and 132B. The data from the database 134 may be uploaded using transactions having tasks to store one or more sets of data where the sets of data are stored in a table of the non-relational database 118 as described herein with reference to FIG. 3.

The sensitive enterprise data from the database 134 may be obfuscated so that any sensitive information is stored in the non-relational database in a form that cannot be easily perceived. For example, sensitive data from the enterprise database 134 and sensitive portions of the updated data from in the new data queue 136 may be processed using a cryptographic hash function such as SHA-1 before being uploaded to the non-relational database 118.

The DPSS 138 may also process the received network data using the same cryptographic hash function before sending the data from the queue 136 to the data matching service 110 to be checked for sensitive information. The example data matching service 110 is a network-connected web service that implements a representational state transfer (REST) application programming interface (API) 112 which is accessed by the enterprise environment 130 via the network 120. In example embodiments, the enterprise environment accesses the data matching service 110 to upload the enterprise data 134 to the non-relational database 118 and to send the network data from the new data queue 136 to the data matching service for comparison to the sensitive enterprise data in the non-relational database 118.

The processing system 116 of the data matching service 110 compares the network data received from the enterprise environment 130 to the sensitive enterprise data stored in the non-relational database 118 and returns a result of the comparison to the enterprise environment via the API 112.

Figure 2:
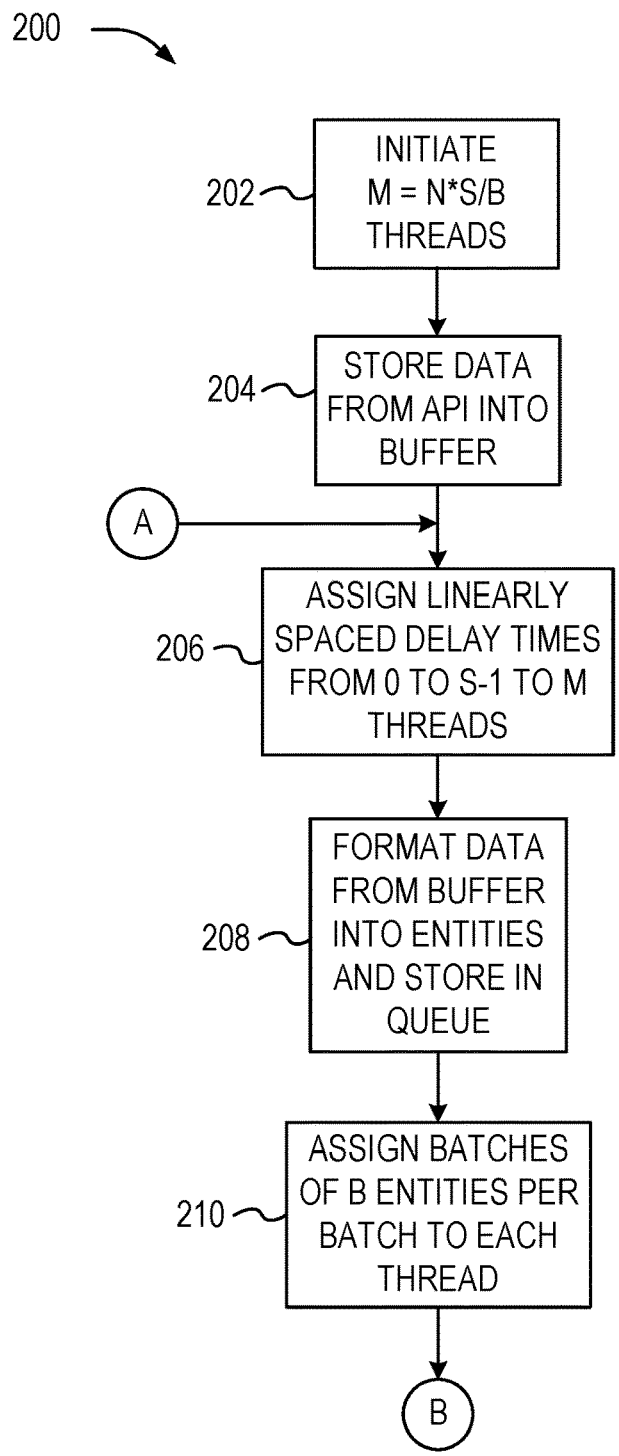
FIGS. 2 and 3 are flow-chart diagrams of methods performed by a data matching system according to an example embodiment.

FIG. 2 is a flow-chart diagram illustrating a method 200 that may be implemented by the data matching service to store sensitive data from the enterprise data 134 in the non-relational database 118. As described herein, this data may be from multiple instances of the enterprise database 134 in multiple enterprise environments and may be provided to the data matching service 110 before any network data to be screened is received from the servers 132A and/or 132B. Before storing the data in the non-relational database 118, the processing system 116 initiates M threads at operation 202. In an example embodiment, the number of threads M is given by equation (1).

$$M=N*S/B \quad (1)$$

In equation (1), S is a transaction processing time limit, B is the number of data entities in each batch that may be handled concurrently by the database 118, and N is the throughput of the non-relational database 118. In one embodiment, N may be 20,000 data entities per second, S may be 30 seconds, B may be 100 data entities per batch, and the throttling interval, T, may be one second. In some embodiments, these parameters may be defined by input received via a user interface.

To achieve the throughput N according to equation (1), the computing system 116 initiates 6,000 threads and distributes the tasks among the threads such that each thread includes one batch. If the processing system 116 starts all 6,000 threads in parallel, the non-relational database 118 may concurrently receive a transaction including up to 600,000 data entity request tasks. These 600,000 data entry requests would be throttled by the non-relational database to 20,000 requests. This would result in 580,000 dropped or delayed data entity requests. The method 200 processes the data entities at the maximum throughput while handling all data entity requests in the transaction within the transaction processing time limit. In order to meet these constraints, operation 204 spreads the processing of the data entity requests over the transaction processing time limit S.

The examples described below typically handle a large number of data entry request tasks s in one transaction processing time. Another example, however, may handle as few as two data entry request tasks in a transaction processing time. The system used in this example has a throughput that is not able to handle two concurrent data entity request tasks. This example initiates two threads and assigns a delay of zero to one thread and a delay greater than zero (e.g., one-half of the transaction processing time) to the other thread. Each of the two data entry request tasks is assigned to a respective one of the two threads, such that the first thread handles the first task immediately and the second thread handles the second task with the non-zero delay.

Figure 3:
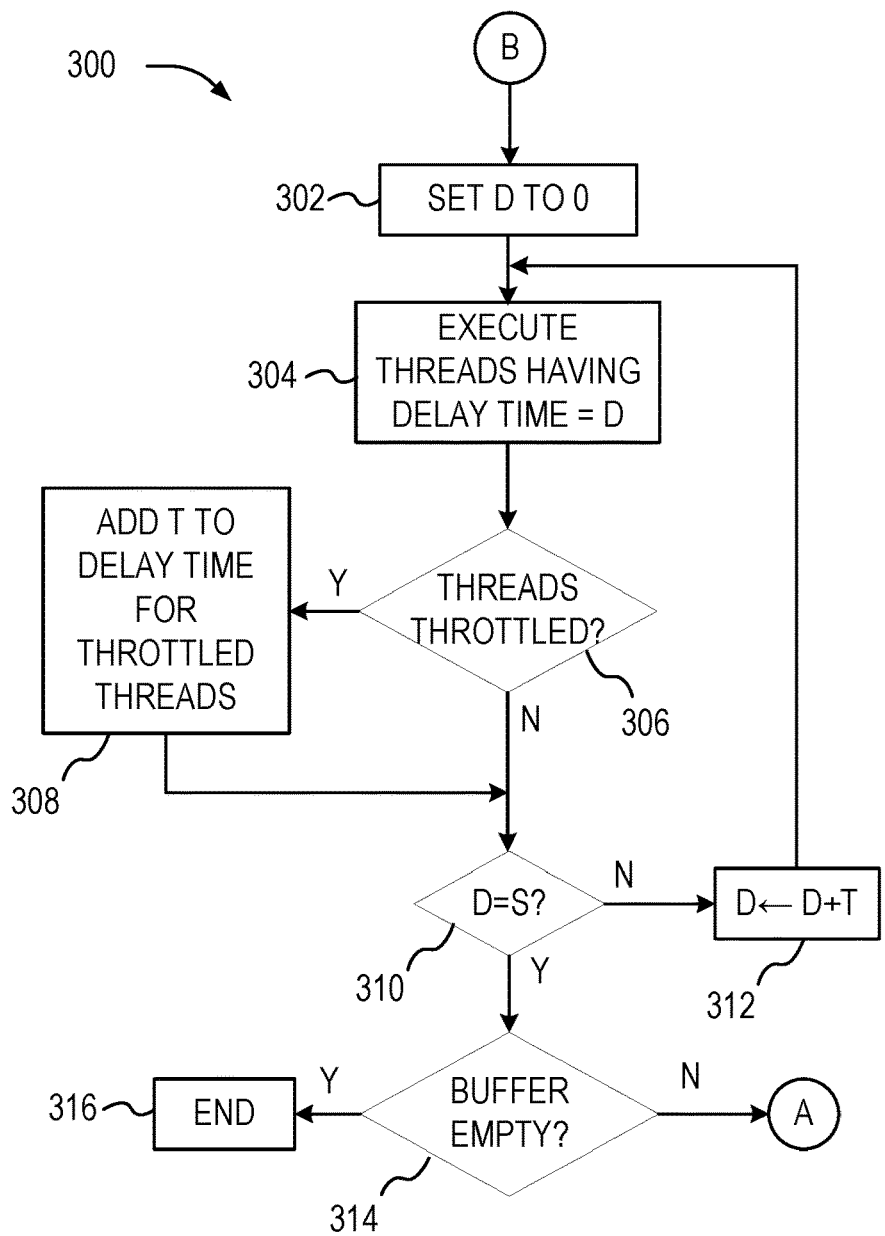

For the sake of simplicity, the description of the operation of the method 200, shown in FIG. 2, and the method 300, shown in FIG. 3, is based on a simpler non-relational database 118. Example parameters of this simpler non-relational database 118 are given in Table 1.

TABLE 1

| Parameter | Value |
| --- | --- |
| Throttling Interval (T) | 1 s |
| Transaction Processing Time Limit (S) | 10 s |
| Throughput (N) | 100 data entities/s |
| Number of Data Entities Per Batch (B) | 1 |

In this example, the number of allocated threads is M=N*S/B=1,000. At operation 204, the processing system 116 buffers the sensitive enterprise data transaction received via the REST API 112 in a buffer 114. Because B=1, the example shown in Table 1 assigns only one data entity write task to each thread. Thus, the number of threads executed by the processing system 116 at any time is the same as the number of data entities being written into the non-relational database 118.

Off-page connector A shows an entry point to operation 206 of the method 200 from a method 300, described below with reference to FIG. 3. In an example embodiment, operation 206 pseudo-randomly assigns linearly-spaced delay values to each of the 1,000 allocated threads. In the example shown in Table 1, successive delay values are separated by the throttling interval T=1 s and operation 206 assigns S=10 different delay values, 0 to 9. In one example, the delay values are assigned using a pseudo-random number generator having a uniform distribution. This may be achieved using a linear-feedback shift-register in which the values generated are divided into S=10 bins. Values in the first bin represent a delay of 0 s, values in the second bin represent a delay of 1 s, and so forth up to the values in the last bin, which represent a delay of 9 s. Alternatively, the delay values may be assigned to the threads using a different mechanism such as a round-robin assignment.

The processing system 116, at operation 208, extracts the transaction data from the buffer, formats the data into data entities, and stores the data entities in the queue 117. The format of the data entities is a format used by the data matching service 110 to enable comparison of the network data, received from the enterprise environment, to the sensitive enterprise data stored in the non-relational database 118. At operation 210, the processing system 116 distributes the data entities among the threads by assigning the data entities stored in the queue 117 to each of the 1000 threads, where each data entity represents a separate data entity storage task. Method 200 then transfers control to method 300, shown in FIG. 3 as indicated by the off-page connector B.

FIG. 3 is a flow-chart diagram showing the operation of the example data matching service 110 when the 1,000 threads access the transaction data entity write tasks assigned to the threads from the queue 117. Although operation 206 assigns delay times of 0 to 9 to the threads according to a uniform distribution, there may be some variation in the total number of threads corresponding to each delay value. The delay time 9 is less than the transaction processing time limit 10. This is illustrated by Table 2 corresponding to the simplified system described above with reference to Table 1.

TABLE 2

| | Delay value | | | | | | | | | |
|---|---|---|---|---|---|---|---|---|---|---|
| | 0 | 1 | 2 | 3 | 4 | 5 | 6 | 7 | 8 | 9 |
| # threads | 97 | 103 | 104 | 101 | 98 | 105 | 95 | 94 | 100 | 104 |

As shown in Table 2, some of the delay values are assigned to more than 100 threads and some are assigned to fewer than 100 threads. As described above, the throttling threshold for the example non-relational database is 100 threads, each thread implements a task to store one data entity since, in this example, the number of data entities per batch, B, is 1. An example of this is illustrated by Table 3.

TABLE 3

| Time | Threads Serviced | Threads Throttled |
|---|---|---|
| 0 | 97 | 0 |
| 1 | 100 | 3 |
| 2 | 100 | 7 |
| 3 | 100 | 8 |
| 4 | 100 | 6 |
| 5 | 100 | 11 |
| 6 | 100 | 6 |
| 7 | 100 | 0 |
| 8 | 100 | 0 |
| 9 | 100 | 4 |
| 10 | 4 | 0 |

Table 3 shows that all of the threads having a delay value of 0 and, thus, executing in time slot 0, store their assigned data entities into the non-relational database 118. Only 100 of the 103 total threads having a delay value of 1, however, store their assigned threads into the database 118 in time slot 1. This is due to the throttling threshold on the non-relational database 118 which processes a first portion of the 103 threads, (e.g. 100 data entity write task threads) in a single transaction. In an example embodiment, a second portion of the 103 threads, (e.g., the three threads over the 100 thread throttling threshold) have their delay values changed by one throttling time (e.g., incremented by 1 s) so that these throttled threads are retried in time slot 2. As shown in Table 2, however, 104 threads have a delay value of 2. Thus, in time slot 2, seven threads are throttled, four that originally had a delay value of 2 and three that originally had a delay value of 1 and were retried at time slot 2. In time slot 3, eight threads are throttled, the seven retried from time slot 2 plus one more from the threads having a delay value of 3. As shown in Table 2, only 98 threads have a delay value of 4. Thus, two of the eight threads retried from time slot 3 can be processed in time slot 4, resulting in six threads being throttled in time slot 4. Because 105 threads have a delay value of 5, five of those threads are throttled plus the six threads throttled in time slot 4 for a total of 11 throttled threads in time slot 5.

Only 95 threads have a delay value of 6 so five of the throttled threads retried from time slot 5 can be processed in time slot 6. This results in six threads being throttled in time slot 6. Delay value 7 is assigned to 94 threads, allowing all six of the throttled threads from time slot 6 to be processed in time slot 7. The non-relational database 118 does not throttle any threads in time slot 7. Similarly, because delay value 8 is assigned to 100 threads, these threads are all executed and no threads are throttled in time slot 8. Delay value 9, however, is assigned to 104 threads, causing four threads to be throttled in time slot 9. As described below, the method 300 includes time slot 10, to accommodate any threads that are throttled in time slot 9, the greatest processing delay of the respective assigned processing delays. Time slot 10, which has a processing delay equal to the transaction processing delay, ensures that all data entities assigned to the threads are stored into the non-relational database 118. The transactions submitted in time slot 10 are at the transaction processing time limit, S=10.

The example system according to Tables 2 and 3 handles data entity request tasks at a rate corresponding to the throughput of the non-relational database 118 while ensuring that all data entity request tasks for the transaction are processed within the transaction processing time limit, S.

Referring again to FIG. 3, operation 302 initializes a delay value variable, D. In the illustrated embodiment, the delay value is initialized to 0. Other embodiments could use other initial values while preserving the technique of FIG. 3, which is to execute threads according to their assigned delay values. Operation 304 executes the threads having a delay value equal to the delay value variable, D, to store the data entities associated with the threads into the non-relational database 118. Next, operation 306 determines whether the database 118 throttled any of the threads having the delay value D. If threads were throttled, operation 308 adds the throttling time, T, to the delay value for the throttled threads, Thus, the throttled threads will retry insertion of their associated data entities into the non-relational database 118 during the next time slot. Operation 310 determines whether the delay value variable D is equal to the transaction processing time limit S. When D is not equal to S, operation 312 increments the delay variable, D, by the throttling time, T, and transfers control back to operation 304 to execute the threads having the incremented delay value. After operation 310 determines that D is equal to S, operation 314 determines whether the buffer 114 is empty. If the buffer 114 is not empty, method 300 transfers control to operation 206 of method 200, as indicated by the off-page connector A, to reassign delay values to the threads, format the data in the buffer 115 into data entities in the queue 117, and assign data entities in the queue 117 to the M threads. When operation 314 determines that the buffer 114 is empty, method 300 ends at operation 316.

Operation 310 causes method 300 to store all of the data entities associated with the threads before assigning any new data entities to a thread. This ensures that all data entities associated with all threads are added to the non-relational database 118 before any new data entities are processed. It also ensures that all throttled threads are processed before the next transaction is processed from the buffer.

As an alternative to operation 308 which increments the delay value of a thread linearly by T when the thread is throttled, the method 300 may increment the delay value exponentially when a thread is throttled multiple times. For example, the first time that a thread is throttled during the processing of a data set, the delay value may be incremented by T, the second time by 2T, the third time by 4T, and so on. This alternative may perform better when the throttling is caused by failure of the interface between the processing system 116 and the non-relational database 118 as it may allow time for the failure to be corrected.

Figure 4:
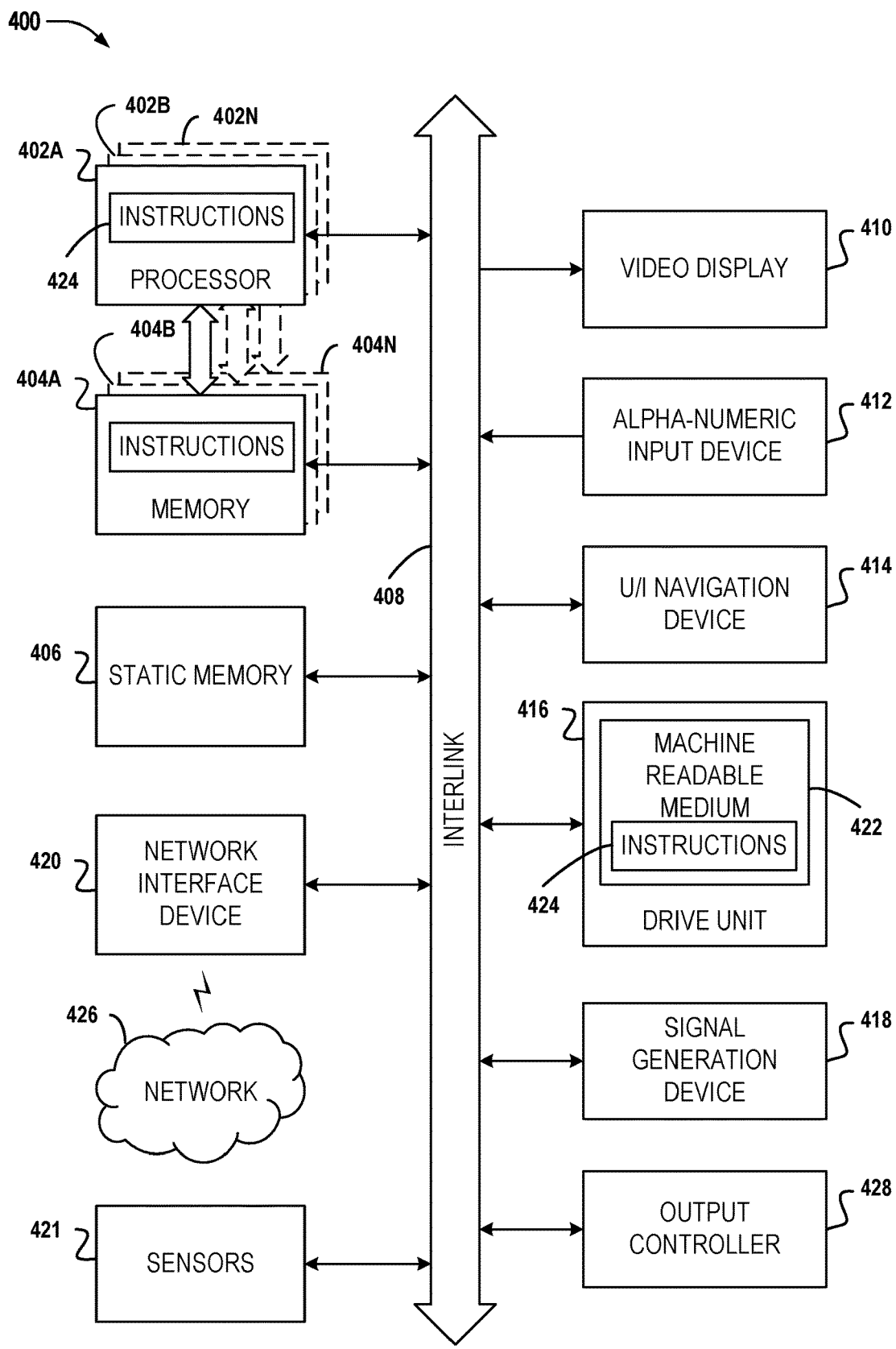
FIG. 4 is a a block diagram of a machine that may be used to implement components of the data protection system shown in FIG. 1 and/or the methods shown in FIGS. 2 and 3, according to an example embodiment.

FIG. 4 illustrates a block diagram of an example machine 400 upon which any one or more of the techniques (e.g., methods) discussed herein may be performed. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 400 may be used to implement portions of the system shown in FIG. 1 and/or to perform one or more of the methods described above with respect to FIGS. 2 and 3. Further, while only a single machine is illustrated, the term "machine" shall also be taken to include any collection of machines that individually or jointly execute a set (or multiple sets) of instructions to perform any one or more of the methodologies discussed herein, such as network-connected (e.g., cloud computing), software as a service (SaaS), other computer cluster configurations.

Machine (e.g., processing system) 400 may include one or more hardware processors 402A, 402B, . . . , 402N, each including, for example, a central processing unit (CPU), a graphics processing unit (GPU), a hardware processor core, multiple hardware processor cores, or any combination thereof), one or more memories 404A, 404B, . . . , 404N, and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the memories 404A, 404B, . . . , 404N, within static memory 406, or within the hardware processor 402 during execution thereof by the machine 400. In an example, one or any combination of the hardware processors 402A, 402B, . . . , 402N, the memories 404A, 404B, . . . , 404N, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 424 may further be transmitted or, received over a communications network 426 using a transmission medium via the network interface device 420. The machine 400 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 420 may wirelessly communicate using Multiple User MIMO techniques.

Examples

Example 1 is a method for controlling tasks in a transactional processing system comprising: receiving, by a processor, a transaction including multiple tasks and having a transaction processing time limit; assigning, by the processor, the multiple tasks among a plurality of threads; assigning, by the processor to each of the plurality of threads, a respective processing delay between no delay and a delay less than the transaction processing time limit; processing, by the processor, the multiple tasks via the plurality of threads according to the respective processing delays.

In Example 2, the subject matter of Example 1 includes, establishing, by the processor, the plurality of threads based on a predetermined throughput of the transaction processing system and the transaction processing time limit.

In Example 3, the subject matter of Examples 1-2 includes, wherein processing the multiple tasks includes: determining a total number of threads, of the plurality of threads, that have a particular processing delay of the respective processing delays; processing a first portion of the total number of threads in response to the total number of threads exceeding a throttling threshold; and assigning, to a second portion the total number of threads in excess of the throttling threshold, a processing delay greater than the particular processing delay.

In Example 4, the subject matter of Example 3 includes, processing, with a processing delay corresponding to the transaction processing time limit, ones of the plurality of threads having a greatest processing delay of the respective processing delays that were in excess of the throttling threshold.

In Example 5, the subject matter of Examples 1-4 includes, wherein assigning the respective processing delay to each of the plurality of threads includes assigning respective linearly-spaced processing delays to the plurality of threads.

In Example 6, the subject matter of Example 5 includes, wherein assigning the respective processing delay to each of the plurality of threads includes assigning the respective linearly-spaced processing delay to each thread based on a pseudo-random number generator having a uniform distribution.

In Example 7, the subject matter of Examples 1-6 includes, wherein the transaction includes first and second tasks and the method comprises: assigning the first task to a first thread of the plurality of threads and the second task to a second thread of the plurality of threads; and assigning a delay of zero to the first thread and a delay greater than zero to the second thread.

Example 8 is an apparatus for distributing load on a data processing system, comprising: a memory containing instructions, the instructions causing the data processing system to perform operations comprising: receiving a transaction including multiple tasks and having a transaction processing time limit; allocating, based on a throughput of the data processing system and the transaction processing time limit, a plurality of threads; distributing the multiple tasks among the allocated threads; and assigning a respective processing delay between no delay and a delay less than the transaction processing time limit to each of the allocated threads.

In Example 9, the subject matter of Example 8 includes, the operations further comprising processing the multiple tasks by the plurality of threads at times determined by the respective processing delays.

In Example 10, the subject matter of Example 9 includes, the operations further comprising processing, at a processing delay corresponding to the transaction processing time limit, ones of the allocated threads not processed at the times determined by the respective processing delays.

In Example 11, the subject matter of Examples 9-10 includes, the operation of processing the task comprising storing respective data entities into respective rows of a non-relational database.

In Example 12, the subject matter of Examples 8-11 includes, the operations further comprising: determining a total number of threads, of the plurality of threads, that have a particular processing delay of the respective processing delays; processing a first portion of the total number of threads in response to the total number of threads exceeding a throttling threshold; and assigning, to a second portion of the total number of threads in excess of the throttling threshold, a processing delay greater than the particular processing delay.

In Example 13, the subject matter of Examples 8-12 includes, the operation of assigning the respective processing delays comprising assigning respective linearly-spaced processing delays to the plurality of threads.

In Example 14, the subject matter of Examples 8-13 includes, the operation of assigning the respective processing delay to each of the plurality of threads comprising assigning the respective processing delay to each thread based on a pseudo-random number generator having a uniform distribution.

Example 15 is a memory including program instructions which, when executed by a data processing system, cause the data processing system to perform operations comprising: receiving a transaction including multiple tasks and having a transaction processing time limit; distributing the multiple tasks among a plurality of threads; assigning a respective processing delay between no delay and a delay less than the transaction processing time limit to each of the allocated threads; and processing the multiple tasks via the plurality of threads at times determined by the respective processing delays.

In Example 16, the subject matter of Example 15 includes, allocating, by the processor, the plurality of threads based on a predetermined throughput of the data processing system and the transaction processing time limit.

In Example 17, the subject matter of Examples 15-16 includes, the operations further comprising: determining a total number of threads, of the plurality of threads, that have a particular processing delay of the respective processing delays; processing a first portion of the total number of threads in response to the total number of threads exceeding a throttling threshold; and assigning, to a second portion of the total number of threads in excess of the throttling threshold, a processing delay greater than the particular processing delay.

In Example 18, the subject matter of Example 17 includes, the operations further comprising processing, with a processing delay corresponding to the transaction processing time limit, ones of the plurality of threads having a greatest processing delay of the respective processing delays that were in excess of the throttling threshold.

In Example 19, the subject matter of Examples 15-18 includes, the operation of assigning a respective processing delay to each of the plurality of threads comprising assigning the respective processing delay to each thread based on a pseudo-random number generator having a uniform distribution.

In Example 20, the subject matter of Examples 15-19 includes, the operation of processing the multiple tasks comprising storing respective data entities into respective rows of a non-relational database.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the scope of the appended claims.

In particular and in regard to the various functions performed by the above described components, devices, circuits, systems and the like, the terms used to describe such components are intended to correspond, unless otherwise indicated, to any component which performs the specified function of the described component, e.g., a functional equivalent, even though not structurally equivalent to the disclosed structure, which performs the function in the example illustrated aspects of the claimed subject matter. In this regard, it will also be recognized that the disclosed example embodiments and implementations include a system as well as computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned example systems have been described with respect to interaction among several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Furthermore, while a particular feature of the claimed subject matter may have been disclosed with respect to one of several implementations, such feature may be combined with one or more other features of the other implementations as may be desired and advantageous for any given or particular application. In addition, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

We claim:

1. A method for controlling tasks in a transactional processing system comprising:
    receiving, by a processor:
        a transaction including multiple tasks and having a transaction processing time limit; and
        an indication identifying the multiple tasks as potentially including sensitive information;
    assigning, by the processor, the multiple tasks among a plurality of threads;
    assigning, by the processor to each of the plurality of threads, a respective unique processing delay, each unique processing delay being between no delay and a delay less than the transaction processing time limit;
    determining, based on the indication, that at least one of the multiple tasks includes sensitive information; and
    processing, by the processor, the multiple tasks via the plurality of threads according to the respective unique processing delays based on the determination.

2. The method of claim 1 further comprising establishing, by the processor, the plurality of threads based on a predetermined throughput of the transaction processing system and the transaction processing time limit.

3. The method of claim 1, wherein processing the multiple tasks includes:
    determining a total number of threads, of the plurality of threads, that have a particular processing delay of the respective processing delays;

processing a first portion of the total number of threads in response to the total number of threads exceeding a throttling threshold; and assigning, to a second portion the total number of threads in excess of the throttling threshold, a processing delay greater than the particular processing delay.

4. The method of claim 3, further comprising processing, with a processing delay corresponding to the transaction processing time limit, ones of the plurality of threads having a greatest processing delay of the respective processing delays that were in excess of the throttling threshold.

5. The method of claim 1, wherein assigning the respective processing delay to each of the plurality of threads includes assigning respective linearly-spaced processing delays to the plurality of threads.

6. The method of claim 5, wherein assigning the respective processing delay to each of the plurality of threads includes assigning the respective linearly-spaced processing delay to each thread based on a pseudo-random number generator having a uniform distribution.

7. The method of claim 1, wherein the transaction includes first and second tasks and the method comprises:
assigning the first task to a first thread of the plurality of threads and the second task to a second thread of the plurality of threads; and
assigning a delay of zero to the first thread and a delay greater than zero to the second thread.

8. An apparatus for distributing load on a data processing system, comprising:
a memory containing instructions, the instructions causing the data processing system to perform operations comprising:
receiving a transaction including multiple tasks and having a transaction processing time limit;
receiving an indication identifying the multiple tasks as potentially including sensitive information;
allocating, based on a throughput of the data processing system and the transaction processing time limit, a plurality of threads;
distributing the multiple tasks among the allocated threads; and
assigning a respective unique processing delay, each unique processing delay being between no delay and a delay less than the transaction processing time limit to each of the allocated threads, wherein each unique processing delay is selected based on a determination of whether the multiple tasks include sensitive information.

9. The apparatus of claim 8, the operations further comprising processing the multiple tasks by the plurality of threads at times determined by the respective processing delays.

10. The apparatus of claim 9, the operations further comprising processing, at a processing delay corresponding to the transaction processing time limit, ones of the allocated threads not processed at the times determined by the respective processing delays.

11. The apparatus of claim 9, the operation of processing the task comprising storing respective data entities into respective rows of a non-relational database.

12. The apparatus of claim 8, the operations further comprising:
determining a total number of threads, of the plurality of threads, that have a particular processing delay of the respective processing delays;
processing a first portion of the total number of threads in response to the total number of threads exceeding a throttling threshold; and
assigning, to a second portion of the total number of threads in excess of the throttling threshold, a processing delay greater than the particular processing delay.

13. The apparatus of claim 8, the operation of assigning the respective processing delays comprising assigning respective linearly-spaced processing delays to the plurality of threads.

14. The apparatus of claim 8, the operation of assigning the respective processing delay to each of the plurality of threads comprising assigning the respective processing delay to each thread based on a pseudo-random number generator having a uniform distribution.

15. A non-transitory memory including program instructions which, when executed by a data processing system, cause the data processing system to perform operations comprising:
receiving a transaction including multiple tasks and having a transaction processing time limit;
receiving an indication identifying the multiple tasks as potentially including sensitive information;
distributing the multiple tasks among a plurality of threads;
assigning a respective unique processing delay, each unique processing delay being between no delay and a delay less than the transaction processing time limit to each of the allocated threads;
determining, based on the indication, that at least one of the multiple tasks includes sensitive information; and
processing the multiple tasks via the plurality of threads at times determined by the respective unique processing delays based on the determination.

16. The memory of claim 15, further comprising allocating, by the processor, the plurality of threads based on a predetermined throughput of the data processing system and the transaction processing time limit.

17. The memory of claim 15, the operations further comprising:
determining a total number of threads, of the plurality of threads, that have a particular processing delay of the respective processing delays;
processing a first portion of the total number of threads in response to the total number of threads exceeding a throttling threshold; and
assigning, to a second portion of the total number of threads in excess of the throttling threshold, a processing delay greater than the particular processing delay.

18. The memory of claim 17, the operations further comprising processing, with a processing delay corresponding to the transaction processing time limit, ones of the plurality of threads having a greatest processing delay of the respective processing delays that were in excess of the throttling threshold.

19. The memory of claim 15, the operation of assigning a respective processing delay to each of the plurality of threads comprising assigning the respective processing delay to each thread based on a pseudo-random number generator having a uniform distribution.

20. The memory of claim 15, the operation of processing the multiple tasks comprising storing respective data entities into respective rows of a non-relational database.

* * * * *